US012707550B2

(12) United States Patent
Nakazawa et al.

(10) Patent No.: US 12,707,550 B2
(45) Date of Patent: Aug. 11, 2026

(54) LAMP ELECTRONIC CONTROL UNIT

(71) Applicant: Koito Manufacturing Co., Ltd., Tokyo (JP)

(72) Inventors: Yuichi Nakazawa, Shizuoka (JP); Taichi Nakamachi, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 39 days.

(21) Appl. No.: 18/884,211

(22) Filed: Sep. 13, 2024

(65) Prior Publication Data

US 2025/0008628 A1 Jan. 2, 2025

Related U.S. Application Data

(63) Continuation of application No. PCT/JP2023/009620, filed on Mar. 13, 2023.

(30) Foreign Application Priority Data

Mar. 14, 2022 (JP) ................................ 2022-039624

(51) Int. Cl.
*H05B 47/17* (2020.01)
*B60Q 1/02* (2006.01)

(52) U.S. Cl.
CPC .............. *H05B 47/17* (2020.01); *B60Q 1/02* (2013.01)

(58) Field of Classification Search
CPC .......... H05B 47/17; H05B 47/18; B60Q 1/02; B60Q 1/12; B60Q 1/1407; B60Q 1/38; B60Q 2400/30
See application file for complete search history.

(56) References Cited

U.S. PATENT DOCUMENTS

| | | | | |
|---|---|---|---|---|
| 2014/0112015 | A1 | 4/2014 | Kurebayashi et al. | |
| 2018/0056851 | A1 | 3/2018 | Kim et al. | |
| 2019/0110345 | A1* | 4/2019 | Ichikawa ................ | F21S 41/16 |
| 2022/0086992 | A1* | 3/2022 | Miyashita ................ | B60Q 1/28 |

FOREIGN PATENT DOCUMENTS

| | | |
|---|---|---|
| JP | 2014082147 A | 5/2014 |
| JP | 2014094666 A * | 5/2014 |

OTHER PUBLICATIONS

Narui, Translation of JP 2014094666 A, 2014 (Year: 2014).*

(Continued)

*Primary Examiner* — Renan Luque
(74) *Attorney, Agent, or Firm* — Buchanan Ingersoll & Rooney PC

(57) ABSTRACT

A lamp ECU can control an additional lamp. A connector includes a power supply pin that receives battery voltage ECUB from a vehicle, a communication pin connected to a vehicle bus, and an output pin to be connected to an additional lamp. An output node of a power supply circuit is connected to the output pin and outputs power supply voltage from the output node in an enabled state. In a first mode, a first controller controls the enabled and disabled states of the power supply circuit according to a turn-on/off instruction for the additional lamp received via the vehicle bus. In a second mode, a second controller controls an output interface circuit according to the turn-on/off instruction.

5 Claims, 6 Drawing Sheets

(56) References Cited

OTHER PUBLICATIONS

International Preliminary Report on Patentability (Form PCT/IB/373) and the Written Opinion of the International Searching Authority (Form PCT/ISA/237) issued on Sep. 10, 2024, by the International Bureau of WIPO in corresponding International Application No. PCT/JP2023/009620. (10 pages).
International Search Report (Form PCT/ISA/210) issued on May 23, 2023, by the Japanese Patent Office in corresponding International Application No. PCT/JP2023/009620. (6 pages).
Extended European Search Report issued on Jun. 17, 2025, in corresponding European Patent Application No. 23770730.2. (11 pages).

* cited by examiner

LAMP ELECTRONIC CONTROL UNIT

BACKGROUND

1. Technical Field

The present disclosure relates to a lamp used for a vehicle such as an automobile.

2. Description of the Related Art

In recent years, vehicle lamps have been enhanced in functionality, and a head lamp is provided with a plurality of lamps having different roles, such as a low beam, a high beam, a turn signal lamp, a position lamp, and a daytime running lamp.

As one of the lamps, there is a cornering lamp (side illumination lamp). The cornering lamp is provided in association with the head lamp and irradiates the turning direction.

The interface of the cornering lamp has several different specifications. Conventionally, a lamp electronic control unit (ECU) incorporated in the head lamp has been designed for each specification of the cornering lamp. That is, an automobile manufacturer needs to select and design a different lamp ECU for each specification of the cornering lamp.

SUMMARY

The present disclosure has been made in view of such a problem, and an exemplary object of an aspect of the present disclosure is to provide a lamp ECU that can support an additional lamp having a different interface.

An aspect of the present disclosure relates to a lamp electronic control unit capable of controlling an additional lamp. A lamp electronic control unit includes a connector including a power supply pin that receives battery voltage from a vehicle, a communication pin connected to a vehicle bus, and an output pin to be connected to the additional lamp, a power supply circuit including an output node connected to the output pin and structured to output power supply voltage from the output node in an enabled state, a first controller structured to control, in a first mode, the enabled state and a disabled state of the power supply circuit according to a turn-on/off instruction for the additional lamp received via the vehicle bus, an output interface circuit including an output node connected to the output pin, and a second controller structured to control, in a second mode, the output interface circuit according to the turn-on/off instruction.

Note that freely-selected combination of the above components, and mutual substitution of the components and expressions among a method, an apparatus, a system, and the like are valid as aspects of the present invention or the present disclosure. Furthermore, the description of this section (SOLUTION TO PROBLEM) does not describe all essential features of the present invention, and thus subcombinations of these features described may also be the present invention.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Overview of Embodiments

Figure 1:
FIG. 1 is a block diagram of a lamp system according to one embodiment.
Figure 1:
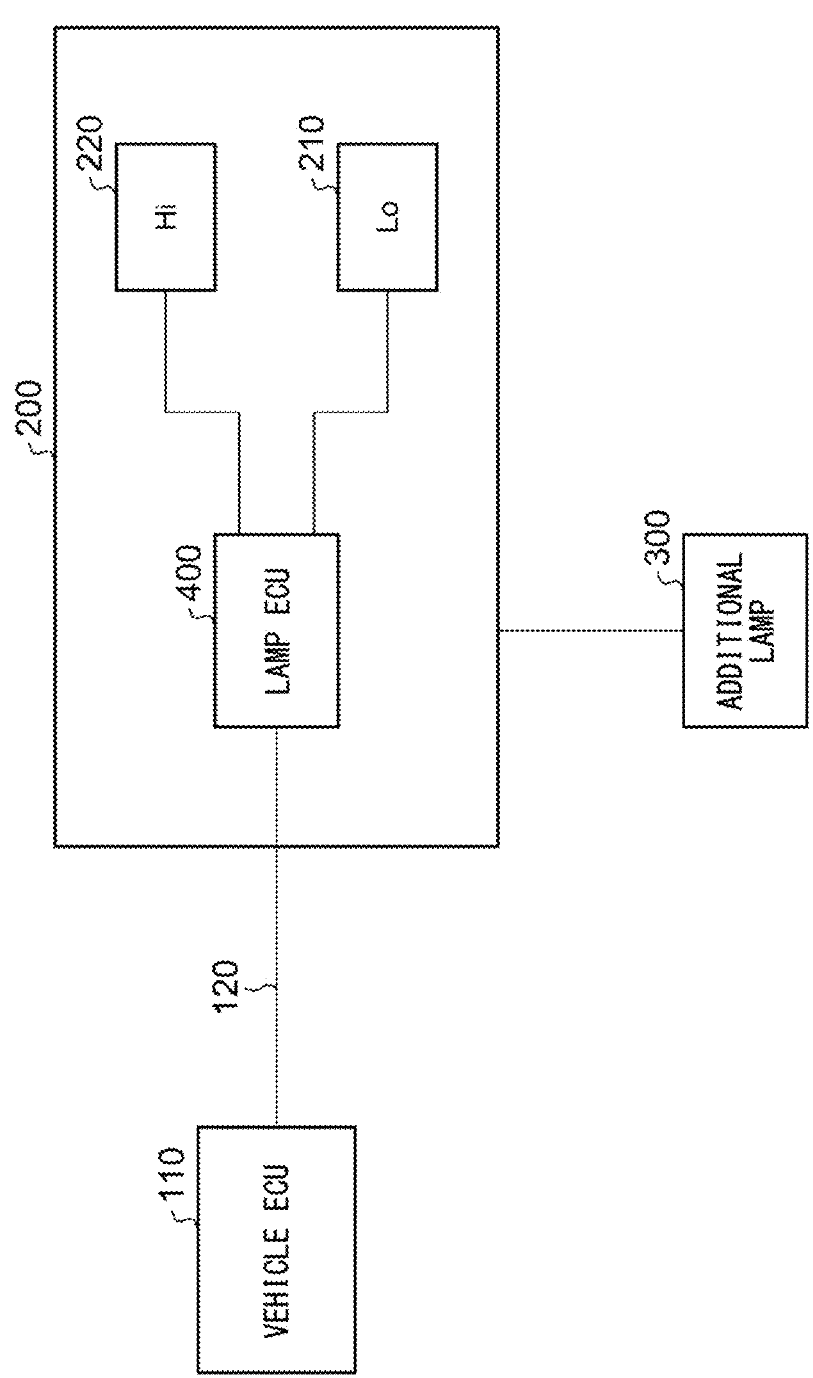

An overview of some example embodiments of the present disclosure will be described. This overview describes some concepts of one or more embodiments in a simplified manner for the purpose of basic understanding of the embodiments before providing the detailed description that follows, and does not limit the scope of the invention or disclosure. This overview is not a comprehensive overview of all possible embodiments, and is not intended to identify key elements of all embodiments or define the scope of some or all aspects. For convenience, "one embodiment" may be used to refer to one embodiment (example or modification) or a plurality of embodiments (examples or modifications) disclosed in the present specification.

A lamp electronic control unit according to one embodiment can control an additional lamp. The lamp electronic control unit includes a connector including a power supply pin that receives battery voltage from a vehicle, a communication pin connected to a vehicle bus, and an output pin to be connected to the additional lamp, a power supply circuit including an output node connected to the output pin and structured to output power supply voltage from the output node in an enabled state, a first controller structured to control, in a first mode, the enabled state and a disabled state of the power supply circuit according to a turn-on/off instruction for the additional lamp received via the vehicle bus, an output interface circuit including an output node connected to the output pin, and a second controller structured to control, in a second mode, the output interface circuit according to the turn-on/off instruction.

According to this configuration, by switching the mode of the lamp electronic control unit according to the interface of the additional lamp, the function of the output pin in the connector can be switched between two states. That is, the additional lamp having different interfaces can be supported. In addition, since two pins having different functions are integrated into one pin, an increase in cost can be avoided.

In one embodiment, the power supply circuit may include a switch provided between the power supply pin and the output pin. The first controller may control on and off of the switch in the first mode.

In one embodiment, the additional lamp may be a cornering lamp.

In one embodiment, the additional lamp may be a turn lamp.

In one embodiment, the additional lamp may be a daytime running light.

In one embodiment, the additional lamp may be a clearance lamp.

Embodiments

Hereinbelow, preferred embodiments will be described with reference to the drawings. Similar or identical components, members, and processes illustrated in the respective figures are labeled with the same reference signs, and description of the duplicate components is omitted as needed. Further, the embodiments are not intended to limit the disclosure and the invention, but are merely examples, and all features described in the embodiments and combinations thereof are not necessarily essential to the disclosure and the invention.

In the present specification, "a state in which a member A is connected to a member B" includes not only a case where the member A and the member B are physically and directly connected to each other, but also a case where the member A and the member B are indirectly connected to each other via another member which does not substantially affect an electric connection state between the member A and the member B or which does not impair a function or an effect exhibited by coupling between the member A and the member B.

Similarly, "a state in which a member C is connected (provided) between the member A and the member B" includes not only a case where the member A and the member C, or the member B and the member C are directly connected to each other, but also a case where the members are indirectly connected to each other via another member which does not substantially affect an electric connection state between the members or which does not impair a function or an effect exhibited by the connection between the members.

In addition, in the present specification, an electric signal such as a voltage signal or a current signal, or a sign attached to a circuit element such as a resistor, a capacitor, or an inductor represents a voltage value, a current value, or a circuit constant (a resistance value, a capacitance value, or an inductance) thereof as necessary.

FIG. 1 is a block diagram of a lamp system 100 according to one embodiment. The lamp system 100 includes a vehicle electronic control unit (ECU) 110, a head lamp 200, and an additional lamp 300.

The head lamp 200 includes a low beam unit 210, a high beam unit 220, and a lamp ECU 400 that controls the low beam unit 210 and the high beam unit 220. The low beam unit 210 includes a light emitting element such as an LED, a driver module that drives the LED, and the like. The high beam unit 220 also has a similar configuration.

The vehicle ECU 110 and the head lamp 200 are connected via a vehicle bus 120 such as a controller area network (CAN) or a local interconnect network (LIN). The vehicle ECU 110 transmits a turn-on/off instruction for the low beam unit 210 and the high beam unit 220 to the lamp ECU 400 via the vehicle bus 120. The lamp ECU 400 controls the turn-on/off operation of the low beam unit 210 and the high beam unit 220 according to the instruction from the vehicle ECU 110.

The additional lamp 300 is incorporated in a housing independent of the head lamp 200. For example, the head lamp 200 is a cornering lamp, and is attached to a bumper or the like.

The turn-on/off instruction for the additional lamp 300 is not directly transmitted from the vehicle ECU 110 to the additional lamp 300, but is transmitted via the head lamp 200. That is, the lamp ECU 400 of the head lamp 200 is structured to receive the turn-on/off instruction for the additional lamp 300 and control the additional lamp 300 according to the turn-on/off instruction.

In an actual vehicle, a set including the head lamp 200 and the additional lamp 300 is provided on each of the right and left sides. The entire configuration of the lamp system 100 has been described above.

Next, the interface of the additional lamp 300 will be described.

Figure 2B:
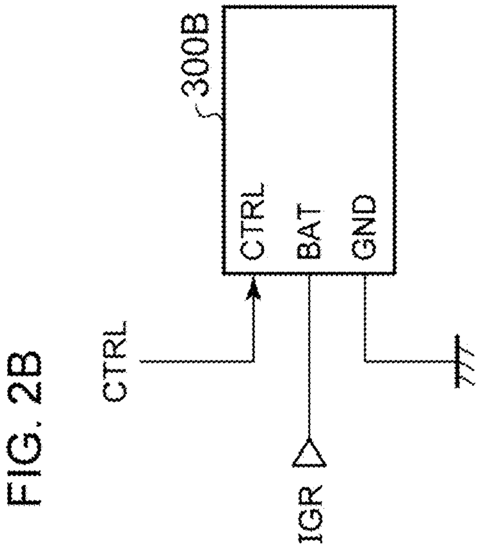
FIGS. 2A and 2B are views illustrating additional lamps having different interfaces.
Figure 2A:
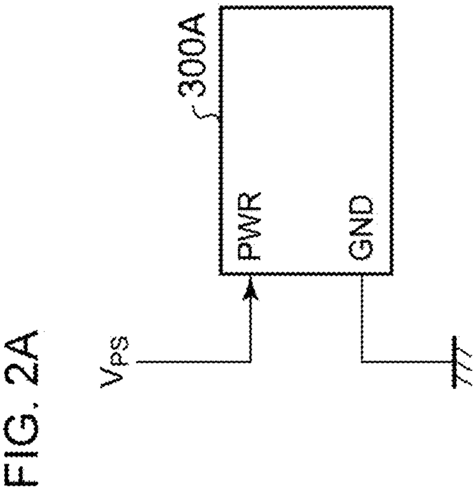

FIGS. 2A and 2B are diagrams illustrating the additional lamps 300 having different interfaces. An additional lamp 300A in FIG. 2A has a power supply terminal PWR and a ground terminal GND. The ground terminal GND is grounded. The power supply terminal PWR is connected to the lamp ECU 400 of the head lamp 200. The additional lamp 300A is turned on when power supply voltage $V_{PS}$ is supplied to the power supply terminal PWR, and is turned off when the power supply voltage $V_{PS}$ is cut off.

An additional lamp 300B in FIG. 2B includes a control terminal CTRL, a battery terminal BAT, and a ground terminal GND. Power supply voltage (battery voltage) IGR from the vehicle is supplied to the battery terminal VBAT. The ground terminal GND is grounded. The control terminal CTRL is a terminal for receiving a control signal $V_{CTRL}$ from the head lamp 200. The control signal $V_{CTRL}$ is a digital binary signal and has, for example, two states including a high state and a low state. The additional lamp 300B is turned on when the control terminal CTRL is at a first level (for example, a low state), and is turned off when the control terminal CTRL is at a second level (for example, a high state).

Next, the lamp ECU 400 connectable to the additional lamp 300A or 300B in FIG. 2A or 2B will be described.

Figure 3:
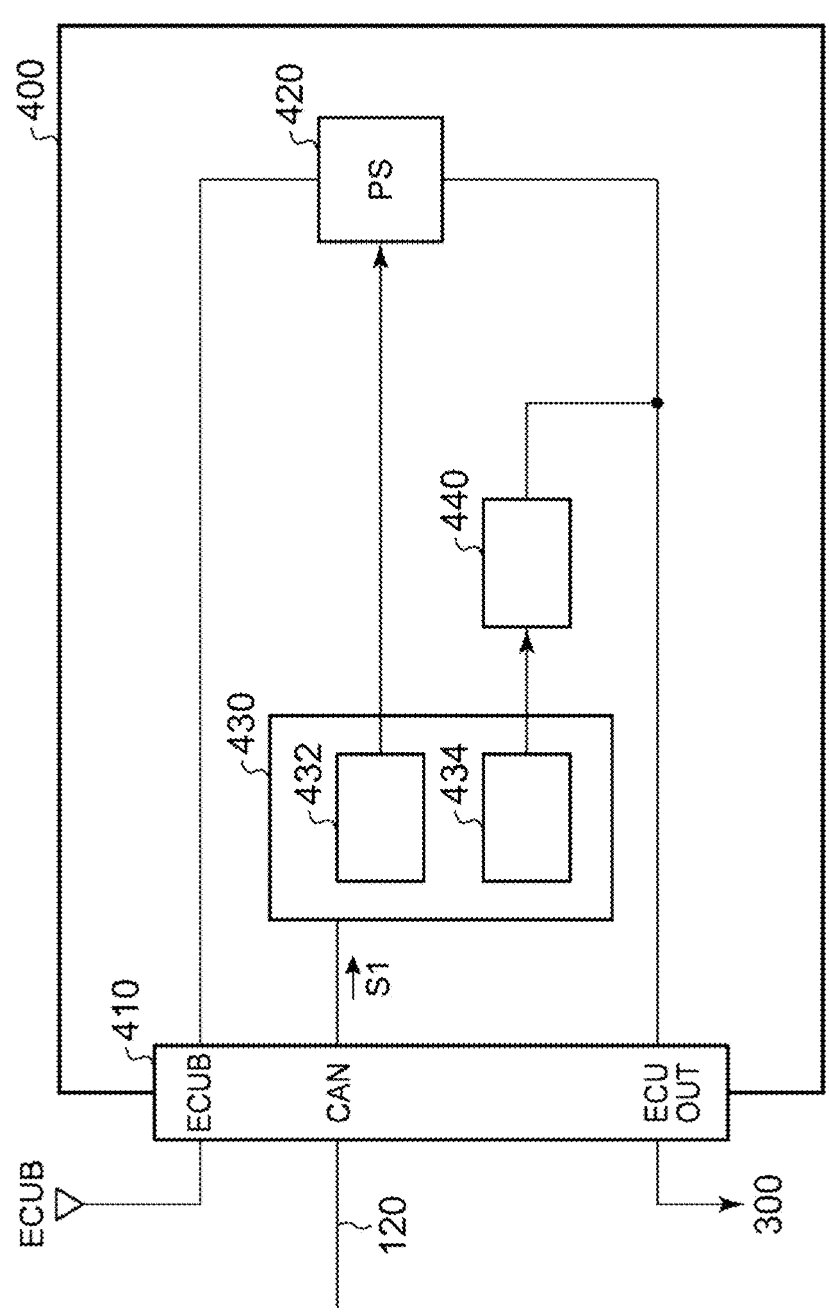
FIG. 3 is a block diagram of a lamp ECU according to one embodiment.

FIG. 3 is a block diagram of the lamp ECU 400 according to one embodiment.

The lamp ECU 400 includes a connector 410, a power supply circuit 420, a microcontroller 430, and an output interface circuit 440.

The connector 410 is connected to a harness (not illustrated) on the vehicle side. The connector 410 includes a power supply pin ECUB, a communication pin CAN, and an output pin ECUOUT. The power supply pin ECUB receives battery voltage ECUB from the vehicle. The communication pin CAN is connected to the vehicle bus 120. The output pin ECUOUT is connected to the additional lamp 300.

The power supply circuit 420 is structured to be switchable between an enabled (on) state and a disabled (off) state. An input node of the power supply circuit 420 is connected to the power supply pin ECUB, and an output node thereof is connected to the output pin ECUOUT. In the enabled state, the power supply circuit 420 outputs the power supply voltage $V_{PS}$ from its output node.

The lamp ECU 400 is switchable between a first mode and a second mode depending on the type of the additional lamp 300 to be combined.

The microcontroller 430 receives a turn-on/off instruction S1 for the additional lamp 300 via the vehicle bus 120. The microcontroller 430 includes a first controller 432 and a second controller 434.

In the first mode, the first controller 432 controls the enabled and disabled states of the power supply circuit 420 according to the turn-on/off instruction S1 for the additional lamp 300 received via the vehicle bus 120.

An output node of the output interface circuit 440 is connected to the output pin ECUOUT. The output interface circuit 440 changes the state of the output pin ECUOUT into one of two states including a high state and a low state (or a low impedance state and a high impedance state). As described below, the output interface circuit 440 may be an open drain circuit, an open collector circuit, a CMOS inverter, or the like.

In the second mode, the second controller 434 controls the output interface circuit 440 according to the turn-on/off instruction S1.

Figure 4:
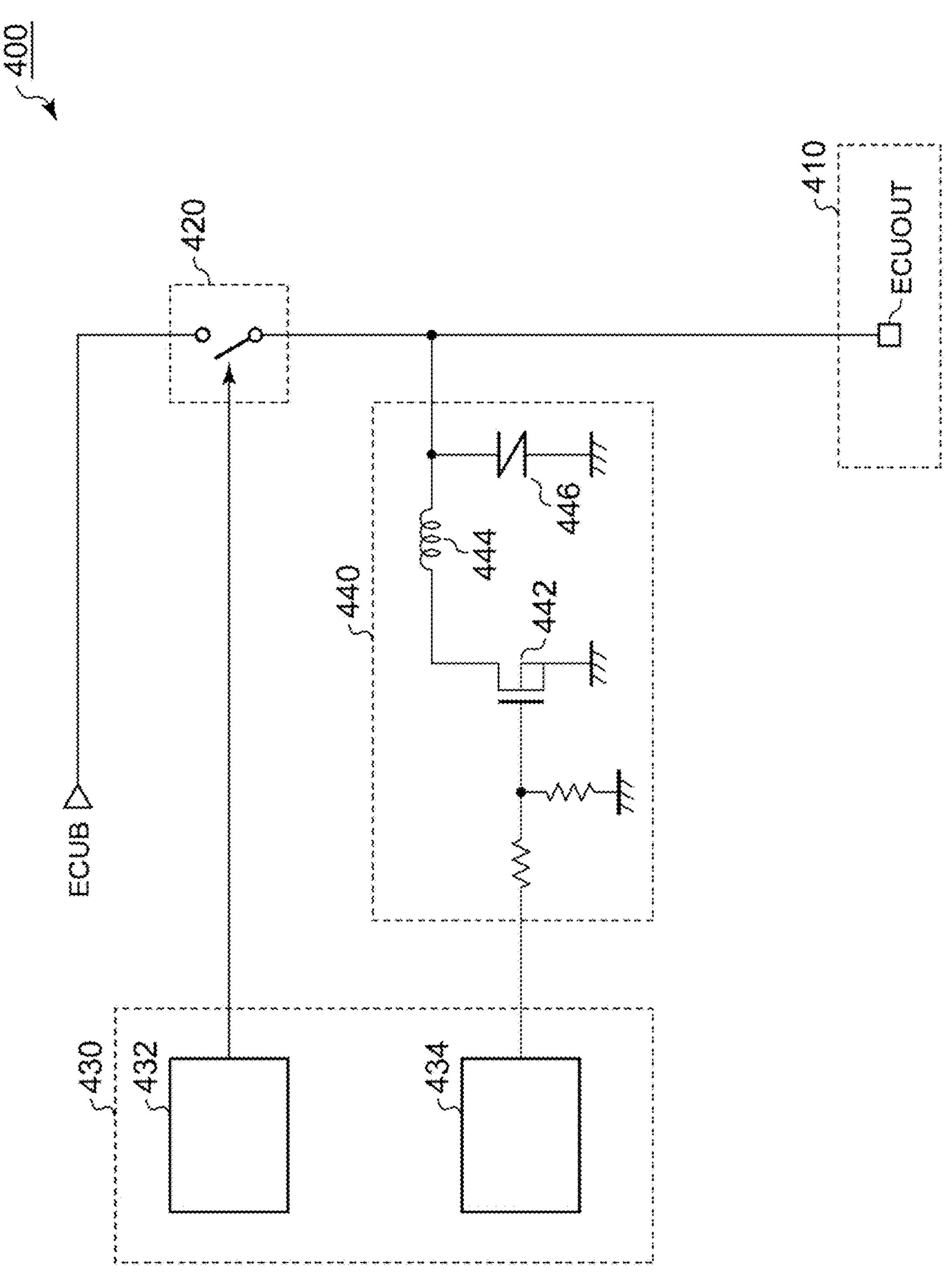
FIG. 4 is a diagram illustrating a specific configuration example of the lamp ECU.

FIG. 4 is a diagram illustrating a specific configuration example of the lamp ECU 400. The power supply circuit 420 includes a switch SW1 provided between the power supply pin ECUB and the output pin ECUOUT. The first controller 432 controls on and off of the switch SW1 in the first mode. Specifically, when the turn-on/off instruction S1 instructs the additional lamp 300 to be turned on, the switch SW1 is turned on, and when the turn-on/off instruction S1 instructs the additional lamp 300 to be turned off, the switch SW1 is turned off.

Note that the configuration of the power supply circuit 420 is not limited to the aforementioned one, and the power supply circuit 420 may be a linear regulator or the like.

The output interface circuit 440 is an open drain circuit and includes a transistor 442, resistors R11 and R12, an inductor 444, and a varistor 446.

The second controller 434 controls on and off of the transistor 442 in the second mode. Specifically, the second controller 434 turns on the transistor 442 when the turn-on/off instruction S1 instructs the additional lamp 300 to be turned on. At this time, the output pin ECUOUT becomes low. Also, the second controller 434 turns off the transistor 442 when the turn-on/off instruction S1 instructs the additional lamp 300 to be turned off. At this time, the output pin ECUOUT becomes high (in a high impedance state).

The varistor 446 is a protective element provided to absorb a surge from the outside. As the protective element, a ceramic capacitor or a Zener diode can be used instead of the varistor 446.

The configuration example of the lamp ECU 400 has been described above.

Figure 5:
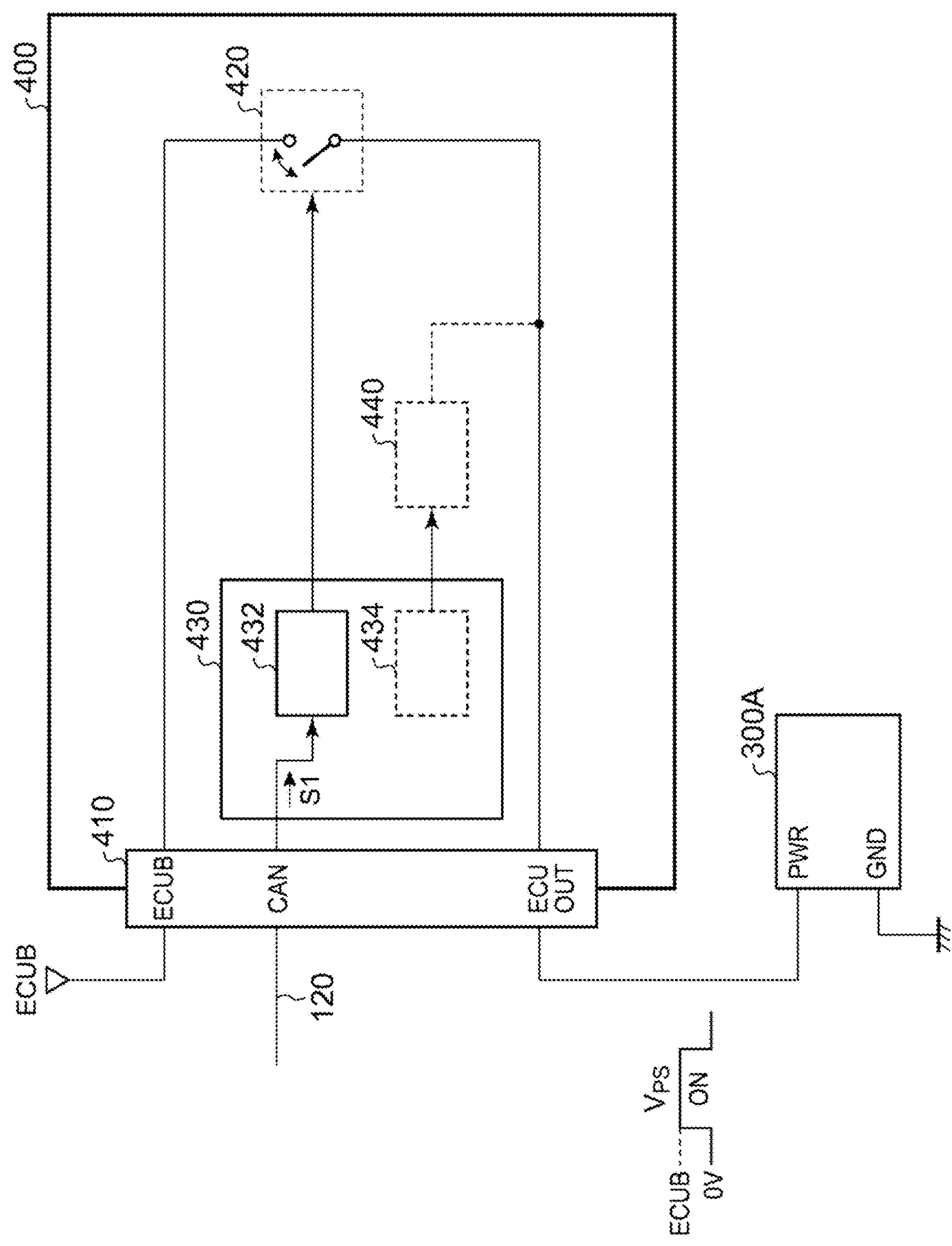
FIG. 5 is a diagram for explaining connection between the lamp ECU and the additional lamp in FIG. 2A.

FIG. 5 is a diagram for explaining connection between the lamp ECU 400 and the additional lamp 300A in FIG. 2A. The output pin ECUOUT is connected to the power supply pin PWR of the additional lamp 300A. The lamp ECU 400 is set to the first mode. The first controller 432 controls the power supply circuit 420 according to the turn-on/off instruction S1. When the power supply circuit 420 is enabled, the power supply voltage $V_{PS}$ is supplied to the additional lamp 300A, and the additional lamp 300A is turned on.

Figure 6:
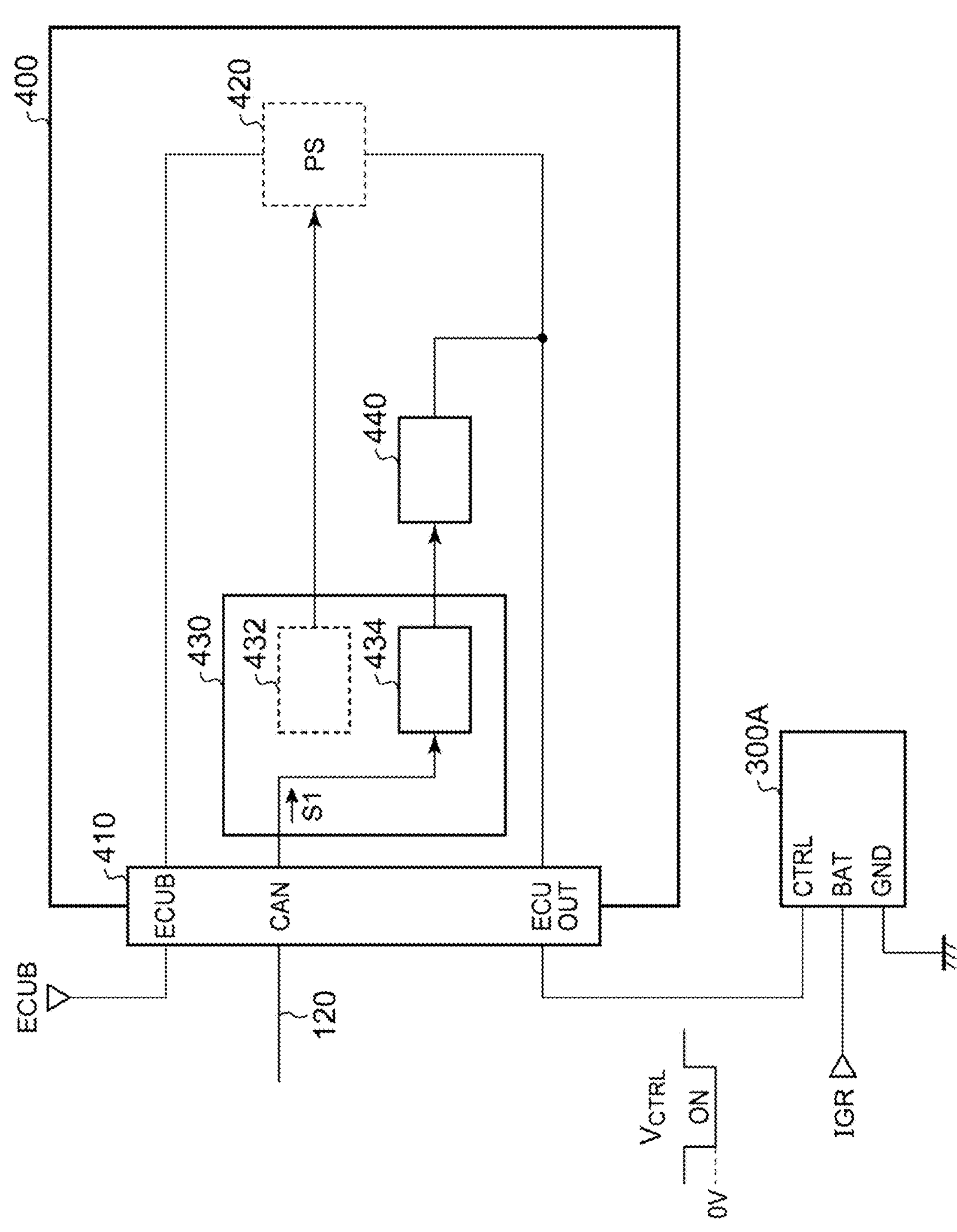
FIG. 6 is a diagram for explaining connection between the lamp ECU and the additional lamp in FIG. 2B.

FIG. 6 is a diagram for explaining connection between the lamp ECU 400 and the additional lamp 300B in FIG. 2B. The output pin ECUOUT is connected to the control terminal CTRL of the additional lamp 300B. The lamp ECU 400 is set to the second mode. The second controller 434 controls the output interface circuit 440 according to the turn-on/off instruction S1. When the output interface circuit 440 outputs a low state, the control pin CTRL of the additional lamp 300B becomes low, and the additional lamp 300B is turned on.

The configuration of the lamp ECU 400 has been described above. According to the lamp ECU 400, by switching the mode of the lamp ECU 400 according to the interface of the additional lamp 300, the function of the output pin ECUOUT in the connector 410 can be switched between two states, and the additional lamps 300A and 300B having different interfaces can be supported.

Since two pins having different functions are integrated and assembled into one output pin ECUOUT, an increase in cost can be avoided.

It is understood by those skilled in the art that the above-described embodiments are examples, and various modifications can be made to combinations of the respective components and the respective processes. Hereinbelow, such modifications will be described.

Modification 1

In the aforementioned embodiment, the additional lamp 300 is a cornering lamp, but the present invention is not limited thereto, and other lamps may be used. For example, the additional lamp 300 may be a turn lamp, a daytime running lamp (DRL), or a clearance lamp.

Although the embodiment according to the present disclosure has been described using specific terms, this description is merely an example for facilitating understanding, and does not limit the present disclosure or the claims. The scope of the present invention is defined by the claims, and therefore, embodiments, examples, and modifications that are not described herein are also included in the scope of the present invention.

What is claimed is:

1. A lamp electronic control unit capable of controlling an additional lamp of a first type and of a second type having different control interfaces, wherein the additional lamp of the first type has a control interface that enters a turn-on state when power supply voltage is supplied to a power supply pin thereof, and the additional lamp of the second type has a control interface whose turn-on/off is controlled according to a state of a control pin thereof, the lamp electronic control unit being configured such that a first mode is selected when the additional lamp of the first type is a control target, and a second mode is selected when the additional lamp of the second type is the control target, the lamp electronic control unit comprising:

a connector including a power supply pin that receives battery voltage from a vehicle, a communication pin connected to a vehicle bus, and an output pin to be connected to the power supply pin of the additional lamp of the first type or the control pin of the additional lamp of the second type;

a power supply circuit including an output node connected to the output pin and structured to output power supply voltage from the output node in an enabled state;

a first controller structured to control, in the first mode, the enabled state and a disabled state of the power supply circuit according to a turn-on/off instruction for the additional lamp received via the vehicle bus;

an output interface circuit including an output node connected to the output pin; and a second controller structured to control, in the second mode, the output interface circuit according to the turn-on/off instruction.

2. The lamp electronic control unit according to claim 1, wherein the power supply circuit includes a switch provided between the power supply pin and the output pin, and the first controller controls on and off of the switch in the first mode.

3. The lamp electronic control unit according to claim 1, wherein the output interface circuit is an open drain circuit.

4. The lamp electronic control unit according to claim 1, wherein the additional lamp is a cornering lamp.

5. A lamp electronic control unit capable of controlling an additional lamp, the lamp electronic control unit comprising:

a connector including a power supply pin that receives battery voltage from a vehicle, a communication pin connected to a vehicle bus, and an output pin to be connected to the additional lamp;

a power supply circuit including an output node connected to the output pin and structured to output power supply voltage from the output node in an enabled state;

a first controller structured to control, in a first mode, the enabled state and a disabled state of the power supply circuit according to a turn-on/off instruction for the additional lamp received via the vehicle bus;

an output interface circuit including an output node connected to the output pin; and a second controller structured to control, in a second mode, the output interface circuit according to the turn-on/off instruction, wherein the output interface circuit is an open drain circuit.

* * * * *